E., A. & J. SCHRUTH.
NECK YOKE.
APPLICATION FILED MAR. 20, 1913.
1,077,645.
Patented Nov. 4, 1913.
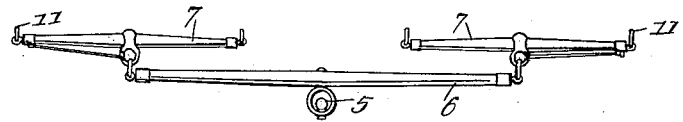
Fig. 1.
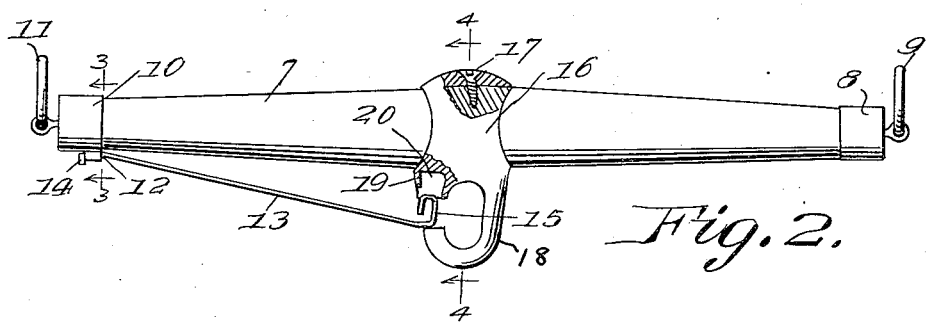
Fig. 2.
Fig. 3.
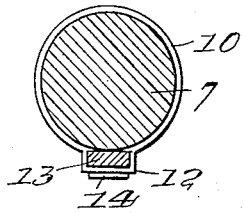
Fig. 4.
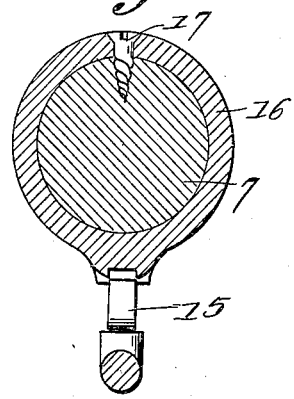
Fig. 5.
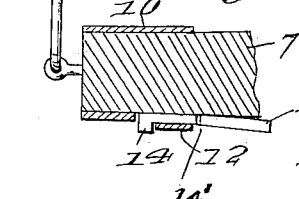
Fig. 6.
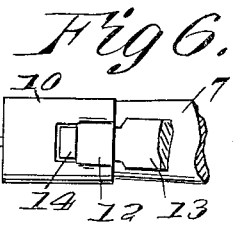
WITNESSES
P. A. Putnam
L. E. Barkley
INVENTORS:
Edward Schruth,
Albert Schruth, and
John Schruth,
by Francis Anneman,
Attorney

UNITED STATES PATENT OFFICE.

EDWARD SCHRUTH, ALBERT SCHRUTH, AND JOHN SCHRUTH, OF PEPIN, WISCONSIN.

NECK-YOKE.

1,077,645.  Specification of Letters Patent.  Patented Nov. 4, 1913.

Application filed March 20, 1913. Serial No. 755,738.

*To all whom it may concern:*

Be it known that we, EDWARD SCHRUTH, ALBERT SCHRUTH, and JOHN SCHRUTH, citizens of the United States of America, and residents of Pepin, in the county of Pepin and State of Wisconsin, have invented certain new and useful Improvements in Neck-Yokes, of which the following is a specification.

This invention relates particularly to means for detachably connecting neck yokes to the tongues of vehicles and an object of the invention is to provide novel means for detachably securing said neck yokes in place in order to permit the ready application or removal of the said neck yokes.

A still further object of this invention is to provide a guard guided by the neck yoke coupling whereby the said guard may be moved to permit a coupling or uncoupling of the neck yoke with the object with which it is connected, the guard being automatically held in position to prevent disengagement of the interengaging parts but capable of manipulation to unguard the same and permit detachment of the interengaging members.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of the front of a wagon tongue showing the neck yoke applied thereto; Fig. 2 illustrates a view in elevation, partly in section, of one of the yokes; Fig. 3 illustrates a sectional view on the line 3—3 of Fig. 2; Fig. 4 illustrates a sectional view on the line 4—4 of Fig. 2; Fig. 5 illustrates a sectional view of a fragment of one of the neck yokes showing the manner of attaching the spring thereto; and Fig. 6 illustrates a view in elevation of a fragment of the yoke illustrating the end thereof to which the spring is anchored.

In these drawings 5 denotes the end of the tongue of a vehicle, 6 a yoke and 7, 7, twin yokes to which the harness rigging is connected, it being understood that the said harness rigging from one animal is connected to one of the twin yokes and the rigging from the other animal of the team is connected to the companion yoke.

As the invention has more to do with the details of construction of the twin yokes, one of said twin yokes is shown on an enlarged scale in Fig. 2 and in the drawing, it will be observed that one end of each twin yoke has a ferrule 8 which is associated with a ring 9 for attachment of the harness rigging of whatever nature. The opposite end of each yoke has a collar 10 and a connection 11 for the harness rigging, the said collar 10 having at its inner margin a small loop 12 forming a seat for one end of the spring 13, the extremity of which spring 13 is bent to form a lug 14 engaging the side of the loop 12 and serving to retain the spring in place, it being observed that longitudinal movement of the spring is prevented by having the spring reduced in width to form the shoulders 14′ which bear against the inner edge of that portion of the collar 10 forming the loop so that said spring is effectually retained in place, although as shown in the drawing the lug 14 at its junction with the spring also bears against an edge of the collar, a portion of which is cut away in forming the loop so that a seat is formed for the spring, as stated. The spring 13 extends longitudinally of the yoke and terminates about midway the length of said yoke in a guard 15 produced by bending the spring at an angle and furthermore curving that angularly bent portion as shown in Fig. 2, it being understood that the outer end of the spring which is anchored to the collar 10 is bent so as to normally retain the spring at its inner end in spaced relation to the yoke so that the spring action thereof will be to cause it to move away from the yoke rather than toward it. The guard 15 coacts with the means for coupling the twin yoke to the neck yoke and this coupling device consists of a collar 16 secured to the neck yoke by means of the screw 17 or other fastening; the said collar having on one side a hook 18 adapted to engage a ring or other device carried by the neck yoke. The collar 16 is also provided with a recessed boss or lug 19 which is in spaced relation to the end of the hook 18, the guard 15 of the spring 13 when in normal position occupying the space between the end of the hook and the boss and acting, as stated, as a guard to prevent passage through the space between the end of the hook and the boss of the ring or device to which the hook is applied, it being obvious that upon pressure on the said spring toward the neck, the guard will enter the recess 20 formed in the boss 19 and permit a clearance of the space between the end of the hook and the boss so that the twin yoke may be uncoupled or detached from the neck yoke. The relation of the guard to the boss is such that a slight portion of the guard is always within the cavity or recess so that lateral displacement of the guard is prevented and a proper entrance of the guard to the recess is insured, upon pressure of the spring, as stated.

We claim—

1. In a neck yoke, a yoke member, a collar secured intermediate the length of the member, a hook formed on said collar, a boss integral with the collar and in spaced relation to the end of the hook, said boss having a recess therein, a collar on the end of the yoke member, a loop formed on the said collar, a spring having one end secured in the loop, a guard formed on the opposite end of said spring, said guard lying within the recess of the collar and adapted to engage the end of the hook for guarding the space between the end of the hook and the boss.

2. In a neck yoke, a yoke member, a collar secured intermediate the length of the said yoke member, a hook formed integral with said collar, a boss on the collar having an aperture, said boss being in spaced relation to the end of the hook, a collar near the end of the yoke member, said collar having a loop integral therewith, a spring having a lug at its end, said spring lying in the loop and having the lug secured between the edge of the loop and the edge of the collar, that portion of the spring within the loop being reduced in width and having shoulders engaging the inner edge of the collar to prevent displacement of the said spring, and a guard formed on the inner end of the spring lying in the space between the end of the hook and the boss.

In testimony whereof, we hereunto affix our signatures in the presence of two witnesses.

EDWARD SCHRUTH.
ALBERT SCHRUTH.
JOHN SCHRUTH.

Witnesses:
WILL G. JULIOT,
G. W. MOORE.

---

Copies of this patent may be obtained for five cents each, by addressing the "Commissioner of Patents, Washington, D. C."